F. WETTEROTH.
GRASS CATCHER.
APPLICATION FILED OCT. 18, 1909.
955,566.
Patented Apr. 19, 1910.
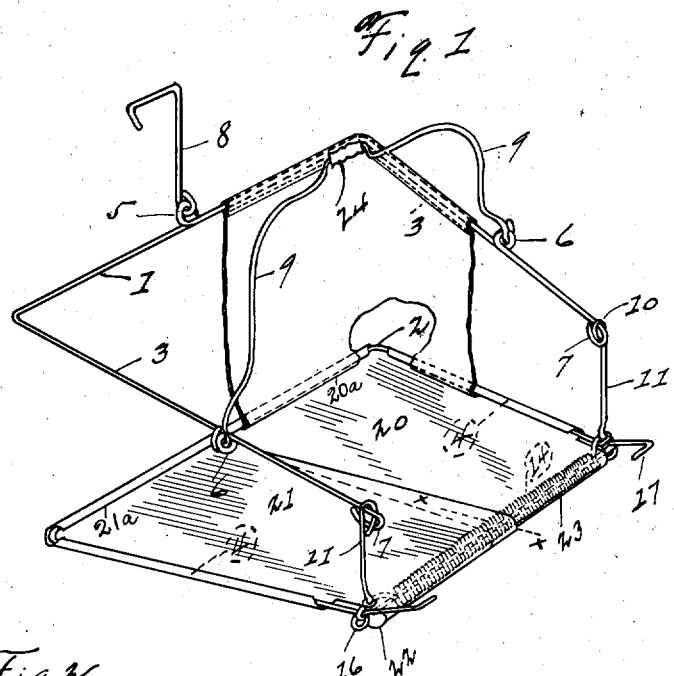
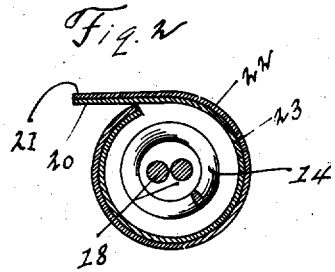
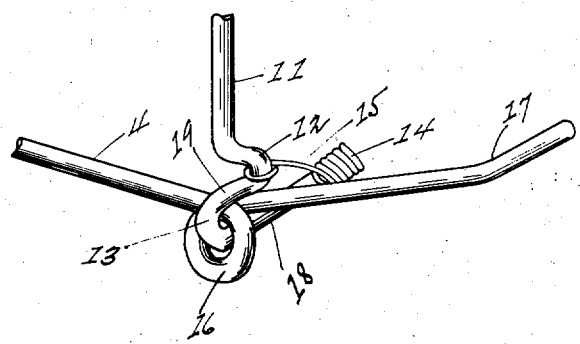
WITNESSES:
Frank Hellage Jr.
Maybelle Small.
INVENTOR.
Frank Wetteroth
BY
Small & Small
ATTORNEYS.

UNITED STATES PATENT OFFICE.

FRANK WETTEROTH, OF ST. LOUIS, MISSOURI, ASSIGNOR TO ZITTLOSEN MANUFACTURING COMPANY, OF ST. LOUIS, MISSOURI, A CORPORATION OF MISSOURI.

GRASS-CATCHER.

955,566.  Specification of Letters Patent.  Patented Apr. 19, 1910.

Application filed October 18, 1909. Serial No. 523,362.

*To all whom it may concern:*

Be it known that I, FRANK WETTEROTH, a citizen of the United States, residing at St. Louis, in the State of Missouri, have invented a new and useful Grass-Catcher, of which the following is a specification.

This invention relates to improvements in receptacles ordinarily disposed to the rear of a lawn mower for the purpose of receiving the cut particles of grass as they are thrown upward by the revolving blades of said mower; and the objects of my improvements are to provide a convenient means for carrying said catcher in the hand after it has been filled with grass which it is desired to discard at some point distant from the lawn; to provide means whereby a spring controlling the distention of overlapping plates, constituting the bottom of the receptacle, is at all times housed and so protected from damage from the action of the elements or otherwise; and to protect the comparatively delicate terminals of said spring from breaking through contact with a hinge joint necessarily adjacent thereto. These and other obvious advantages I attain through the construction illustrated in the accompanying drawing and hereinafter described in detail: Figure 1 being a perspective of the skeleton of the improved receptacle; Fig. 2 depicting a cross-section along line *x—x* of Fig. 1; and Fig. 3 a detail perspective, in enlarged section, illustrating the manner of positively positioning said terminals of the spring out of contact or interference with an adjacent hinge-joint, the view likewise disclosing a socket for the accommodation of a coiled wire forming part of said hinge.

For simplicity of description my receptacle may properly be subdivided into seven distinct members, namely,—an upper frame; a lower frame; a two-part floor or bottom mounted upon said lower frame; opposed angular front-stays engaging said frames in such manner that the receptacle may be collapsed while not in use; a spring; and a particularly disposed handle. Said upper and lower frames consist simply of two lengths of suitable material, preferably wire, each of which is bent to afford an upper rear-bar 1 and a lower rear-bar 2, and upper side-rods 3 and lower side-rods 4. Disposed in rear-bar 1 is an eyelet 5; in side-rods 3 are disposed eyelets 6; and at the forward extremities of said side-rods are provided eyelets 7. Eyelet 5 locks in definite position supporting member 8, the latter when not so locked constantly slipping upon the said bar and so tearing and disfiguring the canvas covering; eyelets 6 lock in definite position the handle-stays 9; and through eyelets 7 are looped eyelets 10 disposed at the upward extremity of front-stays 11. At the lower extremity of each of said stays are disposed a plurality of very decided and peculiarly formed "crimps", 12 and 13, and after the formation thereof the wire is continued at a right angle thereto as at 18 for a considerable distance across the front of the bottom of the receptacle. Thereover is disposed a spring 14, whose terminals 15 tightly engage the wire of said stays at crimp 12 (Fig. 3), and beneath said crimp and in socket, (or crimp) 13 freely works coil 16, the same located at the respective forward extremities of side-rods 4, the wire thereafter projecting forwardly and upward into hooks or trunnions 17. In devices of this character it is obvious that spring 14 is a very important factor and when broken the receptacle is rendered useless until repair: hence it is highly desirable to protect the same from damage or deterioration. In the prior art the terminals of said spring are liable to slip downward until they rest upon the equivalent of coil 16 whose constant reciprocal movement along the axis of rods 18 is then impeded and friction being thus established one or both terminals are gradually attenuated and eventually break. Neither does the prior art disclose a protected spring.

By reference to Fig. 3 of the accompanying drawing it will be apparent that spring terminals 15 are positively prevented from descending upon coil 16, by reason of the presence and peculiar formation of crimps 12 and 13: the former projecting sharply inward and the latter sharply outward to an extent considerably beyond the vertical longitudinal plane of stays 11. Thus a long, slanting surface 19 is presented which, in practical use, acts precisely as a guard interposed over said coil, and even though said spring-terminals should become loosened at their seat in crimp 12 it is a physical impossibility for them to descend upon or contact with the hinge-joint in question.

The bottom of my receptacle consists of two metal plates 20 and 21, certain of whose edges engage the rear-bar and side-rods of the lower frame, the inner edges of said plates overlapping and the width of said plates continuing forwardly over said spring and thence being rebent to form hollow cylinders 22, 23, one of which reciprocates freely within the other for a considerable distance as illustrated in Figs. 1 and 2. Thus the spring is at all times shielded from exposure to physical damage as well as from the ill effects of damp grass and rain.

An additional advantage which I present resides in a means, in the nature of handle 24 and its stays 9, whereby the receptacle may be conveniently carried in one hand when laden with grass or empty, and said means is so disposed that the floor of said receptacle is maintained in horizontal balance during such transportation thus eliminating the danger of spilling débris over lawn and walks.

In disposing the usual canvas covering over the frames it is first placed about lower side-rods 4 and rear-bar 2, and secured in that position by the subsequent overbending of edges 20ᵃ and 21ᵃ of plates 20 and 21, being customarily fastened to top frame members 1 and 3 by stitching, although the small metallic clamps illustrated and claimed in my copending application Serial No. 520,685, may be used if desired.

What I claim as new and desire to secure by Letters-Patent, is:—

1. In a receptacle of the character described, a laterally distensible frame, a spring controlling the lateral distention of said frame, a housing formed integral with the floor of said receptacle and incasing said spring, and means for attaching said receptacle to a lawn mower.

2. In a receptacle of the character described, a laterally distensible frame, a spring controlling the lateral distention of said frame, a two-part floor or bottom prolonged into complementary tubular members housing said spring, and means for attaching said receptacle to a lawn mower.

3. A receptacle of the character described, comprising a two part floor or bottom prolonged into complementary cylindrical members, a spring, said cylindrical members housing said spring, vertical members constituting a part of the frame of said receptacle and adjacent said spring, an extremity of each of said vertical members having a plurality of oppositely directed crimps, the lower of said crimps affording a socket, a coil integral with the receptacle frame, said coil movably disposed in said socket, the terminals of said springs closely engaging another of said crimps disposed above said coil and substantially removed from the vertical plane passing said coil, and means for attaching said receptacle to a lawn mower.

4. A collapsible receptacle of the character described, comprising an upper and a lower frame and members hingedly connecting said frames, a rod at right angles to and in continuity with each of said frame-connecting members, a two-part floor or bottom engaging said lower frame and retaining a flexible covering thereupon, and a spring, said spring disposed over said rods and controlling the lateral distention of said frames, said lower frame hinged upon said rods, and a plurality of oppositely directed crimps disposed in each of said frame-connecting members, one of said crimps affording a socket for the hinging of said lower frame, and the terminals of said spring closely engaging another of said crimps disposed above said hinge and substantially removed from the vertical plane passing through said hinge, a housing completely incasing said spring, an eyelet upon the upper of said frames, a member in pivotal engagement with said eyelet and supporting said receptacle upon the handle of a mower, and a handle so disposed upon a frame of said receptacle as to maintain the floor thereof in horizontal balance during manual carriage.

FRANK WETTEROTH.

Witnesses:
PAUL GROSSE,
JAMES E. GORSTONG.

---

It is hereby certified that in Letters Patent No. 955,566, granted April 19, 1910, upon the application of Frank Wetteroth, of St. Louis, Missouri, for an improvement in "Grass-Catchers," an error appears in the printed specification requiring correction as follows: Page 2, line 64, after the word "passing" insert the word *through;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.* two metal plates 20 and 21, certain of whose edges engage the rear-bar and side-rods of the lower frame, the inner edges of said plates overlapping and the width of said plates continuing forwardly over said spring and thence being rebent to form hollow cylinders 22, 23, one of which reciprocates freely within the other for a considerable distance as illustrated in Figs. 1 and 2. Thus the spring is at all times shielded from exposure to physical damage as well as from the ill effects of damp grass and rain.

An additional advantage which I present resides in a means, in the nature of handle 24 and its stays 9, whereby the receptacle may be conveniently carried in one hand when laden with grass or empty, and said means is so disposed that the floor of said receptacle is maintained in horizontal balance during such transportation thus eliminating the danger of spilling débris over lawn and walks.

In disposing the usual canvas covering over the frames it is first placed about lower side-rods 4 and rear-bar 2, and secured in that position by the subsequent overbending of edges 20ª and 21ª of plates 20 and 21, being customarily fastened to top frame members 1 and 3 by stitching, although the small metallic clamps illustrated and claimed in my copending application Serial No. 520,685, may be used if desired.

What I claim as new and desire to secure by Letters-Patent, is:—

1. In a receptacle of the character described, a laterally distensible frame, a spring controlling the lateral distention of said frame, a housing formed integral with the floor of said receptacle and incasing said spring, and means for attaching said receptacle to a lawn mower.

2. In a receptacle of the character described, a laterally distensible frame, a spring controlling the lateral distention of said frame, a two-part floor or bottom prolonged into complementary tubular members housing said spring, and means for attaching said receptacle to a lawn mower.

3. A receptacle of the character described, comprising a two part floor or bottom prolonged into complementary cylindrical members, a spring, said cylindrical members housing said spring, vertical members constituting a part of the frame of said receptacle and adjacent said spring, an extremity of each of said vertical members having a plurality of oppositely directed crimps, the lower of said crimps affording a socket, a coil integral with the receptacle frame, said coil movably disposed in said socket, the terminals of said springs closely engaging another of said crimps disposed above said coil and substantially removed from the vertical plane passing said coil, and means for attaching said receptacle to a lawn mower.

4. A collapsible receptacle of the character described, comprising an upper and a lower frame and members hingedly connecting said frames, a rod at right angles to and in continuity with each of said frame-connecting members, a two-part floor or bottom engaging said lower frame and retaining a flexible covering thereupon, and a spring, said spring disposed over said rods and controlling the lateral distention of said frames, said lower frame hinged upon said rods, and a plurality of oppositely directed crimps disposed in each of said frame-connecting members, one of said crimps affording a socket for the hinging of said lower frame, and the terminals of said spring closely engaging another of said crimps disposed above said hinge and substantially removed from the vertical plane passing through said hinge, a housing completely incasing said spring, an eyelet upon the upper of said frames, a member in pivotal engagement with said eyelet and supporting said receptacle upon the handle of a mower, and a handle so disposed upon a frame of said receptacle as to maintain the floor thereof in horizontal balance during manual carriage.

FRANK WETTEROTH.

Witnesses:
PAUL GROSSE,
JAMES E. GORSTONG.

---

It is hereby certified that in Letters Patent No. 955,566, granted April 19, 1910, upon the application of Frank Wetteroth, of St. Louis, Missouri, for an improvement in "Grass-Catchers," an error appears in the printed specification requiring correction as follows: Page 2, line 64, after the word "passing" insert the word *through;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.*

Correction in Letters Patent No. 955,566.

It is hereby certified that in Letters Patent No. 955,566, granted April 19, 1910, upon the application of Frank Wetteroth, of St. Louis, Missouri, for an improvement in "Grass-Catchers," an error appears in the printed specification requiring correction as follows: Page 2, line 64, after the word "passing" insert the word *through;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.*